US011362918B2

(12) United States Patent
Shaw et al.

(10) Patent No.: US 11,362,918 B2
(45) Date of Patent: *Jun. 14, 2022

(54) INTELLIGENT ANALYTICS VIRTUAL NETWORK ORCHESTRATION SYSTEM AND METHOD

(71) Applicant: AT&T Intellectual Property I, L.P., Atlanta, GA (US)

(72) Inventors: Venson Shaw, Kirkland, WA (US); Rajendra Prasad Kodaypak, Sammamish, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/330,002

(22) Filed: May 25, 2021

(65) Prior Publication Data

US 2021/0281500 A1 Sep. 9, 2021

Related U.S. Application Data

(63) Continuation of application No. 16/419,450, filed on May 22, 2019, now Pat. No. 11,050,646, which is a (Continued)

(51) Int. Cl.
*H04L 43/0811* (2022.01)
*G06F 9/50* (2006.01)
(Continued)

(52) U.S. Cl.
CPC ........ *H04L 43/0811* (2013.01); *G06F 9/5077* (2013.01); *H04L 47/70* (2013.01); *H04L 67/10* (2013.01); *H04L 67/14* (2013.01)

(58) Field of Classification Search
CPC .......................... H04L 43/0811; G06F 9/5077
See application file for complete search history.

(56) References Cited

U.S. PATENT DOCUMENTS 6,717,913 B1 4/2004 Ghahremani et al.
8,700,002 B2 4/2014 Lopez et al.
(Continued)

FOREIGN PATENT DOCUMENTS

EP 1257945 A2 11/2002
GB 241561 A 2/1926
(Continued)

OTHER PUBLICATIONS

PCT/US17/37018, International Preliminary Report on Patentability, dated Dec. 27, 2018, 10 pages.
(Continued)

*Primary Examiner* — Suraj M Joshi
(74) *Attorney, Agent, or Firm* — Guntin & Gust, PLC; Dana Lemoine

(57) ABSTRACT

Aspects of the subject disclosure may include, for example, detecting a request for a network service between two network nodes and identifying a network path between the two network nodes, wherein the network path is realized by equipment performing a number of network functions. A first network function of the number of network functions is associated with a first number of redundant virtualized network resources performing at least a similar network function as the first network function. Usage metrics are determined corresponding to the first number of redundant virtualized network resources and a first virtualized network resource of the first number of redundant virtualized network resources is assigned to the network path based on the usage metrics to obtain a first assigned virtualized network resource. The network service is provided between the two network nodes using the first assigned virtualized network resource. Other embodiments are disclosed.

20 Claims, 8 Drawing Sheets

Related U.S. Application Data continuation of application No. 15/183,400, filed on Jun. 15, 2016, now Pat. No. 10,348,590.

(51) Int. Cl.
*H04L 47/70* (2022.01)
*H04L 67/10* (2022.01)
*H04L 67/14* (2022.01)

(56) References Cited

U.S. PATENT DOCUMENTS

| | | | |
|---|---|---|---|
| 9,143,926 B2 | 9/2015 | Egner et al. | |
| 9,246,840 B2 | 1/2016 | Anderson et al. | |
| 2013/0054763 A1 | 2/2013 | Van der Merwe et al. | |
| 2014/0229945 A1 | 8/2014 | Barkai et al. | |
| 2014/0317261 A1 | 10/2014 | Shatzkamer et al. | |
| 2014/0317293 A1 | 10/2014 | Shatzkamer et al. | |
| 2015/0063166 A1 | 3/2015 | Sit et al. | |
| 2015/0124622 A1 | 5/2015 | Kovvali et al. | |
| 2015/0149611 A1 | 5/2015 | Lissack | |
| 2015/0180730 A1 | 6/2015 | Felstaine et al. | |
| 2015/0288622 A1 | 10/2015 | Fargano et al. | |
| 2015/0324215 A1* | 11/2015 | Borthakur | H04L 43/0876 718/1 |
| 2015/0326451 A1 | 11/2015 | Rao et al. | |
| 2015/0355919 A1 | 12/2015 | Gatherer et al. | |
| 2015/0358248 A1 | 12/2015 | Saha et al. | |
| 2015/0381423 A1 | 12/2015 | Xiang | |
| 2016/0057209 A1 | 2/2016 | Parikh et al. | |
| 2016/0277509 A1* | 9/2016 | Qiang | H04L 67/16 |
| 2016/0335111 A1 | 11/2016 | Bruun et al. | |
| 2017/0366428 A1 | 12/2017 | Shaw | |
| 2019/0273672 A1 | 9/2019 | Shaw et al. | |
| 2021/0281500 A1 | 9/2021 | Shaw et al. | |

FOREIGN PATENT DOCUMENTS

| | | |
|---|---|---|
| KR | 20130036598 A | 4/2013 |
| WO | 2015126430 A1 | 8/2015 |
| WO | 2015135611 | 9/2015 |
| WO | 2016022698 | 2/2016 |
| WO | 2016048430 | 3/2016 |
| WO | 2016071736 A1 | 5/2016 |

OTHER PUBLICATIONS

PCT/US17/37018, International Search Report and Written Opinion, dated Sep. 7, 2017, 14 pages.

"Bringing Network Function Virtualization to LTE", 4G Americas, 4gamericas.org, Nov. 2014.

Costanzo, Salvatore, "Software Defined Networking and applications in next generation mobile networks", Apr. 2016.

Mijumbi, Rashid et al., "Network function virtualization: State-of-the-art and research challenges", 2015.

Nikaein, Navid et al., "Network store: Exploring slicing in future 5g networks", Proceedings of the 10th International Workshop on Mobility in the Evolving Internet Architecture. ACM, 2015.

Vilalta, R. et al., "Transport PCE network function virtualization", Optical Communication (ECOC), 2014 European Conference on. IEEE, 2014.

Vilalta, Ricard et al., "Transport network function virtualization", Journal of Lightwave Technology 33.8, 2015, 1557-1564.

* cited by examiner

100

300

INTELLIGENT ANALYTICS VIRTUAL NETWORK ORCHESTRATION SYSTEM AND METHOD

CROSS-REFERENCE TO RELATED APPLICATIONS

This application is a continuation of U.S. application Ser. No. 16/419,450, filed May 22, 2019, which is a continuation of U.S. application Ser. No. 15/183,400, filed on Jun. 15, 2016 (now U.S. Pat. No. 10,348,590). The contents of each of the foregoing are hereby incorporated by reference into this application as if set forth herein in full.

FIELD OF THE DISCLOSURE

The subject disclosure relates to an intelligent analytics virtual network orchestration system and method.

BACKGROUND

Network function virtualization (NFV) allows traditional network equipment dedicated to one or more particular network functions to be virtualized using a general-build hardware platform to provide cost reduction, operation efficiency and agility. In general, NFV separates network functions from the hardware they run on through a virtual hardware abstraction. By way of example, an NFV framework has been developed by the European Telecommunications Standards Institute (ETSI) NFV Industry Specification Group (ISG).

At run-time, virtual network functions (VNFs) can be created by instantiating virtual network function (VNF) software on one or more NFV hosts. Connectivity can be established between the VNF instances to implement a network as though the network were implemented with traditional network equipment. This can be accomplished using the VNF deployment and operational information captured in a VNF descriptor (VNFD), as well as additional run-time instance-specific information and constraints.

BRIEF DESCRIPTION OF THE DRAWINGS

Reference will now be made to the accompanying drawings, which are not necessarily drawn to scale, and wherein.

DETAILED DESCRIPTION

Figure 1:
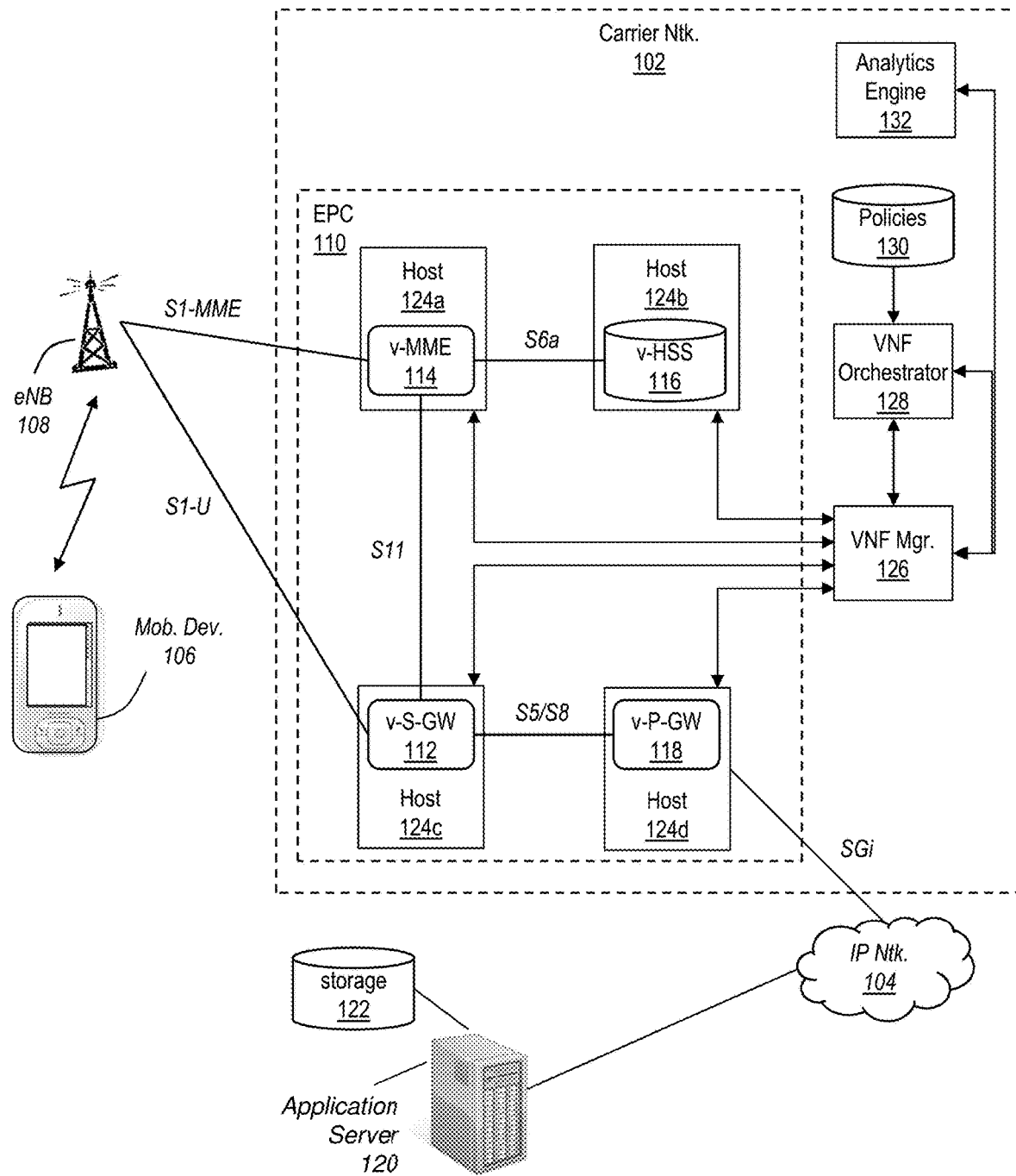
FIG. 1 depicts an illustrative embodiment of a mobile communication system that utilizes virtual network functions.

The subject disclosure describes, among other things, illustrative embodiments for dynamically assigning and/or reassigning VNFs from a pool of VNFs. Other embodiments are described in the subject disclosure.

One or more aspects of the subject disclosure include a system that includes a processing system having a processor and a memory that stores executable instructions. The instructions, when executed by the processing system, facilitate performance of operations that include receiving a request for a mobile cellular service between first user equipment and second user equipment. The operations further include identifying a network path between the first user equipment and the second user equipment, wherein the network path is realized by equipment performing a number of network functions. A first network function of the number of network functions is associated with a first number of redundant virtualized network resources performing at least a similar network function as the first network function and usage metrics are monitored corresponding to the first number of redundant virtualized network resources. A first virtualized network resource of the first number of redundant virtualized network resources is assigned to the network path based on the usage metrics to obtain a first assigned virtualized network resource. The mobile cellular service is provided between the first user equipment and the second user equipment using the first assigned virtualized network resource.

One or more aspects of the subject disclosure include a process that includes detecting, by a system comprising a processing system including a processor, a request for a communication service between a first equipment item and a second equipment item, wherein the first equipment item comprises a wireless mobile device. A network path is identified between the first endpoint and the second endpoint, wherein the network path is realized by equipment performing a number of network functions. A first network function of the plurality of network functions is associated with a first number of redundant virtualized network resources performing at least a similar network function as the first network function. Usage metrics are determined corresponding to the first number of redundant virtualized network resources, and a first virtualized network resource of the first number of redundant virtualized network resources is assigned to the network path based on the usage metrics to obtain a first assigned virtualized network resource. The communication service is provided between the first equipment item and the second equipment item using the first assigned virtualized network resource.

One or more aspects of the subject disclosure include a machine-readable storage medium, including executable instructions that, when executed by a processing system including a processor, facilitate performance of operations. The operations include detecting a request for a network service between two network nodes and identifying a network path between the two network nodes, wherein the network path is realized by equipment performing a number of network functions. A first network function of the number of network functions is associated with a first number of redundant virtualized network resources performing at least a similar network function as the first network function. Usage metrics are determined corresponding to the first number of redundant virtualized network resources and a first virtualized network resource of the first number of redundant virtualized network resources is assigned to the network path based on the usage metrics to obtain a first assigned virtualized network resource. The network service is provided between the two network nodes using the first assigned virtualized network resource.

FIG. 1 depicts an illustrative embodiment of a communication system 100 that provides wireless communication services to mobile devices utilizing virtual network functions. In the illustrative example, a network infrastructure includes a mobile carrier network 102 in communication with other networks, such as an internet protocol (IP) network 104. A mobile device 106 accesses the carrier network 102 by way of a radio access network that includes a radio terminal, such as an evolved Node B (eNB) 108. A link between the mobile device 106 and the eNB 108 is accomplished wirelessly or over-the-air.

In general, complex networks, such as the example network 102, are commonly organized as functional blocks connected by defined interfaces. Each function defines a state and transfer function that defines how the function will behave with regard to inputs received and outputs provided. The inputs received and the outputs provided are defined by interfaces between functions. Each function is relatively autonomous within its definition.

In the illustrative example, the carrier network 102 includes a core network portion, namely, an Enhanced Packet Core (EPC) 110 of a 4G or Long-Term Evolution (LTE) network, according to $3^{rd}$ Generation Partnership Project (3GPP) standards. The EPC or core network 110 includes one or more functional blocks, referred to as network elements. For LTE networks, the core network 110 generally includes a Serving Gateway (S-GW) 112, a Mobility Management Entity (MME) 114, a Home Subscriber Server (HSS) 116 and a Packet Data Network (PDN) Gateway (P-GW) 118 as shown. The core network gateways 112, 114, 116 and 118 are in communication with each according to pre-defined interfaces, e.g., S11, S6a, S5/S8 LTE interfaces, as shown.

The eNB 108 is in communication with the MME 114 through an S1-MME interface and the S-GW 112 through an S1-U interface. Generally, the MME 114 handles control plane activity, whereas the S-GW 112 handles data or user plane activity. Information packets are routed between the P-GW 118 and one or more other networks, such as the IP network 104, an ISM network and/or GSM network (not shown).

In some embodiments, the mobile device 106 is in communication with an application server 120 by way of the carrier network 102. The application server 120 can belong to an enterprise organization, such as a business or other institution. Alternatively or in addition the application server 120 can belong to a third party, such as a cloud service provider, e.g., Google®. In some embodiments, the application server 120 is referred to as a back-end or cloud server, with storage 122 accessible to the server 120. The server 120 can host one or more services according to a service-oriented architecture, e.g., the SAP Enterprise Service Oriented Architecture. The services can be offered to members, e.g., employees, of a particular enterprise, to clients or customers, to vendors or suppliers, to business partners or collaborators, and so forth. The services can be accessed in machine-to-machine transactions from within the premises of the enterprise and/or remotely at an associated network address and by way of network connectivity to the remote machine.

In the illustrative example, the mobile device 106 includes application programs or "apps" that accesses back-end services available from the back-end servers 120. In some embodiments, the mobile device 106 includes a resident back-end client to access services offered by the back-end server 120. Examples of services include business applications related to one or more of accounting, distribution, production, procurement, sales, customer service, corporate performance and governance, human resource and so on.

In some embodiments, the mobile device 106 accesses wireless services by way of the carrier network 102, that include, without limitation, video, voice, e.g., voice over IP, streaming audio, file transfer, ecommerce, message transfer, e.g., short message service (SMS) transfer and/or multimedia message service (MMS) transfer. Alternatively or in addition, the services can include social media services, advertising services, and the like.

The EPC 110 utilizes VNFs, in which each network function, represented by a corresponding virtual functional block 112, 114, 116, 118 is created by a respective software module and hosted on a respective host functional block, or host machine 124a, 124b, 124c, 124d (generally 124). The state and function of each traditional network block are coded into each of the virtualized functional blocks 112, 114, 116, 118 and loaded into an operating system including container interfaces to other functional blocks and a host interface to the host machines 1224. The container interfaces can define how each virtual functional block 112, 114, 116, 118 and its interface functions are loaded onto and supported by its host functional block 124. From the standpoint of operation of the network, there is no difference in the operation of the virtualized functional blocks 112, 114, 116, 118 and functional blocks of a non-virtualized, e.g., traditional network. Although all of the network functions are illustrated as VNFs, it is understood that in at least some embodiments, one or more of the network functions can be non-virtualized, e.g., traditional network functions implemented by corresponding network device(s).

Although host machines 124 are shown as separated elements, they are not necessarily separate machines. The host machines 124 can include computing resources, e.g., one or more of processing, storage, communication, and the like. In some embodiments, the host functional blocks are provided in a pool of resources. The host machines 124 are a portion of that pool of resources as defined by the parameters specified in virtual functional blocks 112, 114, 116, 118. This allows the network operator to flexibly deploy network resources as needed. For example, a subscriber (e.g., a cellphone network subscriber) may choose among several available services, such as voice mail transcription. Some subscribers may choose this option and some may not. If a subscriber chooses to subscribe to this service, a virtual functional block may be deployed to provide that service. At an additional level of sophistication, the virtual functional block may only be deployed when needed.

A virtualized network allows the network operator to use the available capacity for nearly all network functions. Additional marginal capacity is still necessary. However, when the various functions of the network are deployed on to a pool of resources, it is not necessary to have marginal capacity available for every function. Therefore, the total additional capacity of a virtualized network can be much smaller than the combined additional capacity necessary for all of the functions of a non-virtualized network. However, to effectively deploy a virtualized network requires a sophisticated function management system.

An NFV management and organization architectural framework can include a VNF manager 126 and a VNF orchestrator 128. The VNF manager 126 works in concert with other NFV functional blocks, such as the NFV orchestrator 128, and in some embodiments, a virtualized infrastructure manager (not shown). The VNF manager 126 is in communication with each of the host machines 124. The VNF manager 126 can facilitate lifecycle management of VNFs under the control of the NFV orchestrator 128. The VNF manager 126 operations can include one or more of: instantiation of VNFs, scaling of VNFs, updating and/or upgrading VNFs and termination of VNFs. A single VNF manager 126 can manage one or multiple VNFs of similar and/or different functionality. In the illustrative example, one VNF manager 126 manages all of the VNFs 112, 114, 116, 118.

The VNF orchestrator 128 can facilitate provisioning of new network services, generation and/or maintenance of a VNF forwarding graph, and implementation of other VNF features. The VNF orchestrator 128 can also participates in facilitation of lifecycle management of network services, e.g., including one or more of instantiation, scaling out/in, performance measurements, event correlation, termination, and the like. Alternatively or in addition, the VNF orchestrator 128 provides one or more of global resource management, validation and authorization of NFV infrastructure resource requests, and/or policy management for network service instances. In the illustrative example, the VNF orchestrator 128 is in communication with a storage device, e.g., a database 130 that stores policies. The VNF orchestrator 128 accesses policies through the policy database 130, and implements the policies among the VNFs 112, 114, 116, 118 by way of the VNF manager 128.

In some embodiments, the system 100 includes an analytics engine 132. The analytics engine 132 monitors metrics of one or more of the VNFs 112, 114, 116, 118 and/or the host machines 124. For example, the analytics engine 132 receives metrics from the VNFs 112, 114, 116, 118 and/or the host machines 124. Alternatively or in addition, the analytics engine 132 receives metrics from another device, such as the VNF manager 126, the VNF orchestrator 128, or some other device or system, such as an operation support system and/or an operation and maintenance system, and the like. The metrics can include, without limitation, performance metrics, usage metrics, status metrics. For example, the metrics can include one or more of a processing metric, such as processor utilization, a storage metric, such as memory utilization, and or a communication and/or access network, such as input/output (I/O) utilization. The metrics can identify usage and/or availability. Such metrics can be displayed as a numeric value within a range of values, e.g., 1-10, as a percentage, e.g., a percentage of available capacity and/or availability, and the like. Alternatively or in addition, the metrics can be displayed by letter values, e.g., A, B, C, colors, e.g., red, yellow, green, and the like of a predetermined range of letter values, colors, etc.

In some embodiments, the analytics engine 132 receives raw data and processes the raw data to determine a processed metric, such as any of the foregoing examples. Alternatively or in addition, the analytics engine 132 receives processed data. The processed data can be in a suitable format for comparison and/or display. Alternatively or in addition the processed data can require further processing, e.g., scaling, converting, ranging, and the like.

Figure 2:
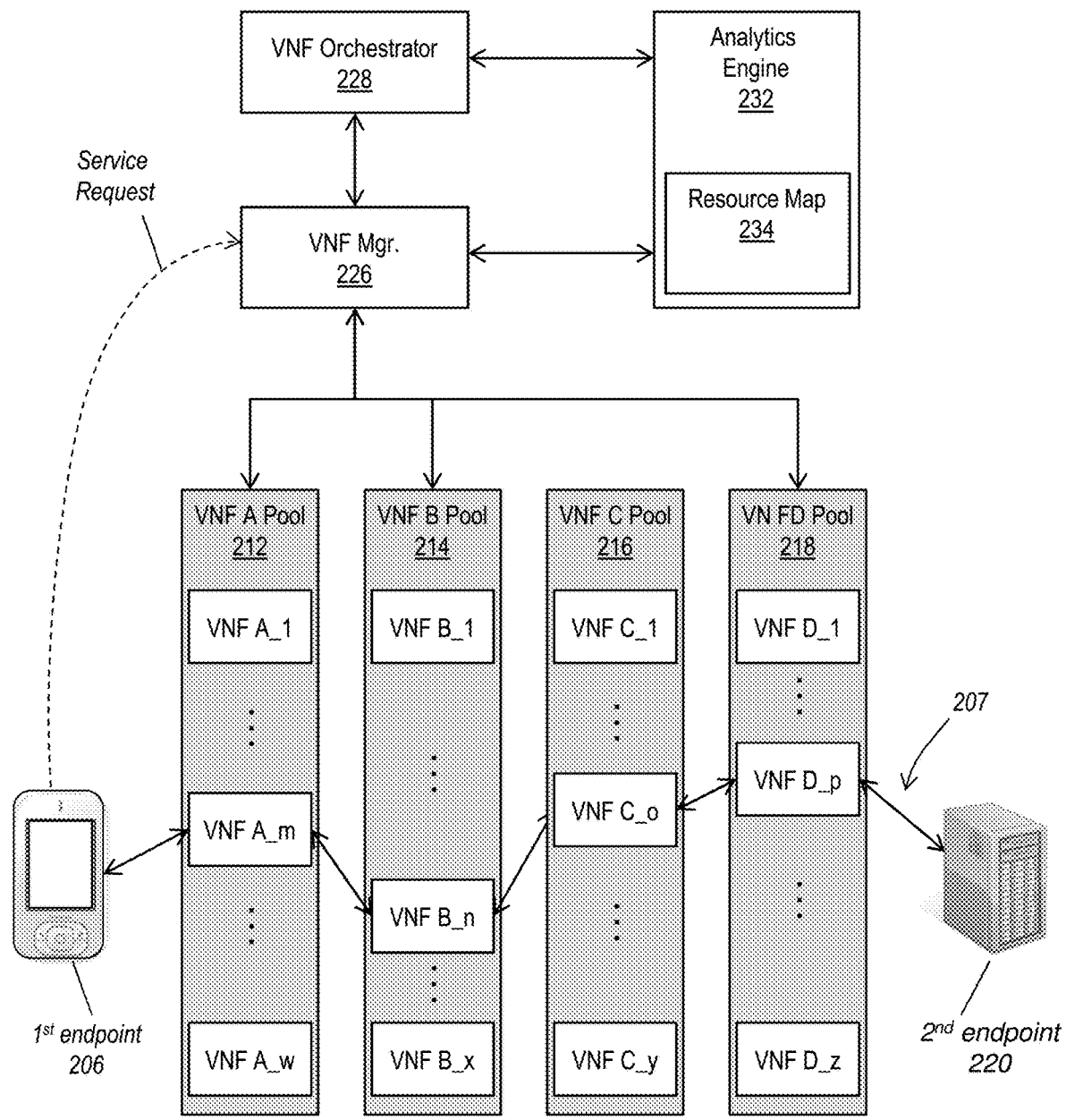
FIG. 2 depicts an illustrative embodiment of a communication system that utilizes virtual network functions.

FIG. 2 depicts an illustrative embodiment of a communication system 200 that utilizes virtual network functions. The system 200 includes one or more pools of VNFs. In the illustrative example, the system 200 includes four such pools, i.e., VNF A pool 212, VNF B pool 214, VNF C pool 216 and VNF D pool 218. Each of the VNF pools includes a respective group of VNFs. Namely, the VNF A pool 212 includes a number, "w," VNFs, illustrated as VNF A_1, . . . , VNF A_m, . . . , VNF A_w. The VNF B pool 214 includes a number, "x," VNFs, illustrated as VNF B_1, . . . , VNF B_n, . . . , VNF B_x. The VNF C pool 216 includes a number, "y," VNFs, illustrated as VNF C_1, . . . , VNF C_o, . . . , VNF C_y. Likewise, The VNF D pool 218 includes a number, "z," VNFs, illustrated as VNF D_1, . . . , VNF D_p, . . . , VNF D_z.

The VNFs of the VNF pools 212, 214, 216, 218 can include VNFs already instantiated on a host platform. It is understood that such instantiated VNFs can participate in one or more network paths between similar and/or dissimilar endpoints. In the illustrative example, a network path 207 is established between a first endpoint 206, e.g., a mobile smart phone, and a second endpoint 220, e.g., an application server, such as a video server, and the like. The particular network path 207 includes the first endpoint 206, the $m^{th}$ VNF, i.e., VNF A_m, of VNF A pool 212, the $n^{th}$ VNF, i.e., VNF B_n, of VNF B pool 214, the $o^{th}$ VNF, i.e., VNF C_o, of VNF C pool 216, the $p^{th}$ VNF, i.e., VNF D_p, of VNF D pool 218, and the second endpoint 220.

In some embodiments, the network path can be arranged in a number of links or segments between two network elements. In the illustrative example, the network path from the $1^{st}$ endpoint 206 to the $2^{nd}$ endpoint 220 can be arranged or otherwise considered and/or analyzed according to the following segmented path: [$1^{st}$ endpoint→VNFA_m]→[VNFB_n→VNFC_o]→[VNFD_p→$2^{nd}$ endpoint]. Likewise, a round-trip and/or bidirectional network path between the $1^{st}$ endpoint 206 and the $2^{nd}$ endpoint 220 can be arranged or otherwise considered and/or analyzed according to the following segmented path: [$1^{st}$ endpoint→VNF A_m]→[VNF B_n→VNF C_o]→[VNF D_p→$2^{nd}$ endpoint]→[$2^{nd}$ endpoint→VNF D_p]→[VNF C_o→VNF B_n]→[VNF A_m→UE].

It is understood in at least some embodiments, the network path includes unidirectional traffic. For example, a first network path 207 is determined for network traffic from the first endpoint 206 to the second endpoint 220; whereas, a second network path (not shown) is determined for network traffic from the second endpoint 220 to the first endpoint 220. The different network paths can include different VNFs within the same VNF pool 212, 214, 216, 218. Alternatively or in addition, the different network paths can include different VNFs within different VNF pools. It is also understood that in at least some embodiments, one or more of the network functions of a network path can be implemented by a non-virtualized or traditional network element. In some embodiments, a unidirectional network path can support broadcast services, data forwarding, and the like.

It is also understood that utilization of such instantiated VNFs can vary according to one or more of network traffic at any given time, a number of network paths supported at any given time, and/or services utilized by the network path(s). Utilization can include, without limitation, processor utilization, e.g., a percentage of available CPU processing capacity, and storage utilization, e.g., a percentage of storage available to the VNFs, such as storage buffers and the like. Alternatively or in addition, utilization can include, without limitation, channel capacity, e.g., a percentage of one or more of available channel bandwidth, a percentage of physical resource block allocated, used or otherwise reserved, message flows, Input/output (I/O), and the like.

Alternatively or in addition utilization can also be based on one or more of Layer 1—traffic data, Layer 2—semantic data, Layer 3—network data, Layer 5—session data, and/or Layer 7—application data associated with one or more of the VNFs.

The system also includes a VNF manager 226, a VNF orchestrator 228 and an analytics engine 232. The VNF manager 226 can be adapted to instantiate, remove and/or otherwise manage the VNFs within one or more of the VNF pools 212, 214, 216, 218. It is understood that in at least some embodiments, any of the management, orchestration and/or analytics functions can be shared and/or otherwise distributed across multiple VNF managers 226, multiple VNF orchestrators 228 and/or multiple Analytics engines 232. For example, such functional splits can be determined by geographical configuration of the network path, in which the network path spans multiple geographic regions managed by different network segments. Alternatively or in addition, such function splits can be determined by network operators, e.g., in which a network path spans multiple network segments managed by different network operators, and the like.

The analytics engine 232 can be adapted to collect, analyze and/or otherwise monitor metrics associated with one or more of the VNFs of the VNF pools 212, 214, 216, 218. Such metrics can include, without limitation, any of the foregoing examples. The metrics can be collected, received and/or monitored directly by the analytics engine 232 and/or received by way of one or more other devices or systems, such as the VNF manager 226 and/or the VNF orchestrator 228. In at least some embodiments, the analytics engine includes a resource map that includes the metrics for each of the VNFs of each of the VNF pools 212, 214, 216, 218. The resource map can be updated routinely, e.g., according to one or more of a timing cycle, network activity, automated control, manual control, and the like.

The VNF orchestrator 228 can be adapted to orchestrate operation of at least a portion of the system 200 based on the monitored metrics. For example, the orchestrator 228 adapts operation and/or configuration of one or more of the VNFs of the VNF pools 212, 214, 216, 218 based on the resource map 234. By way of non-limiting example, such adaptation of operation and/or configuration can include establishing the particular network path 207. Namely, the particular VNFs selected and/or the particular VNF pools selected can be based at least in part on metrics obtained by way of the resource map 234 of the analytics engine.

In at least some embodiments, adaptation of operation and/or configurations by the VNF orchestrator 228 is based on one or more predetermined policies and/or rules. Such policies and/or rules can be based, at least in part, on the metrics and/or other factors. Other factors can include, without limitation, priority of an application and/or service associated with a network path, a performance requirement and/or quality of the application and/or service, a priority of a user, e.g., based on a subscription level, a capability of equipment, such as a mobile device or UE of the $1^{st}$ endpoint 206 and/or an application server of the second endpoint 220. Alternatively or in addition, other factors can include a condition of the network, a time of day, day of week, location, historical conditions, predictions, and the like.

Figure 3:
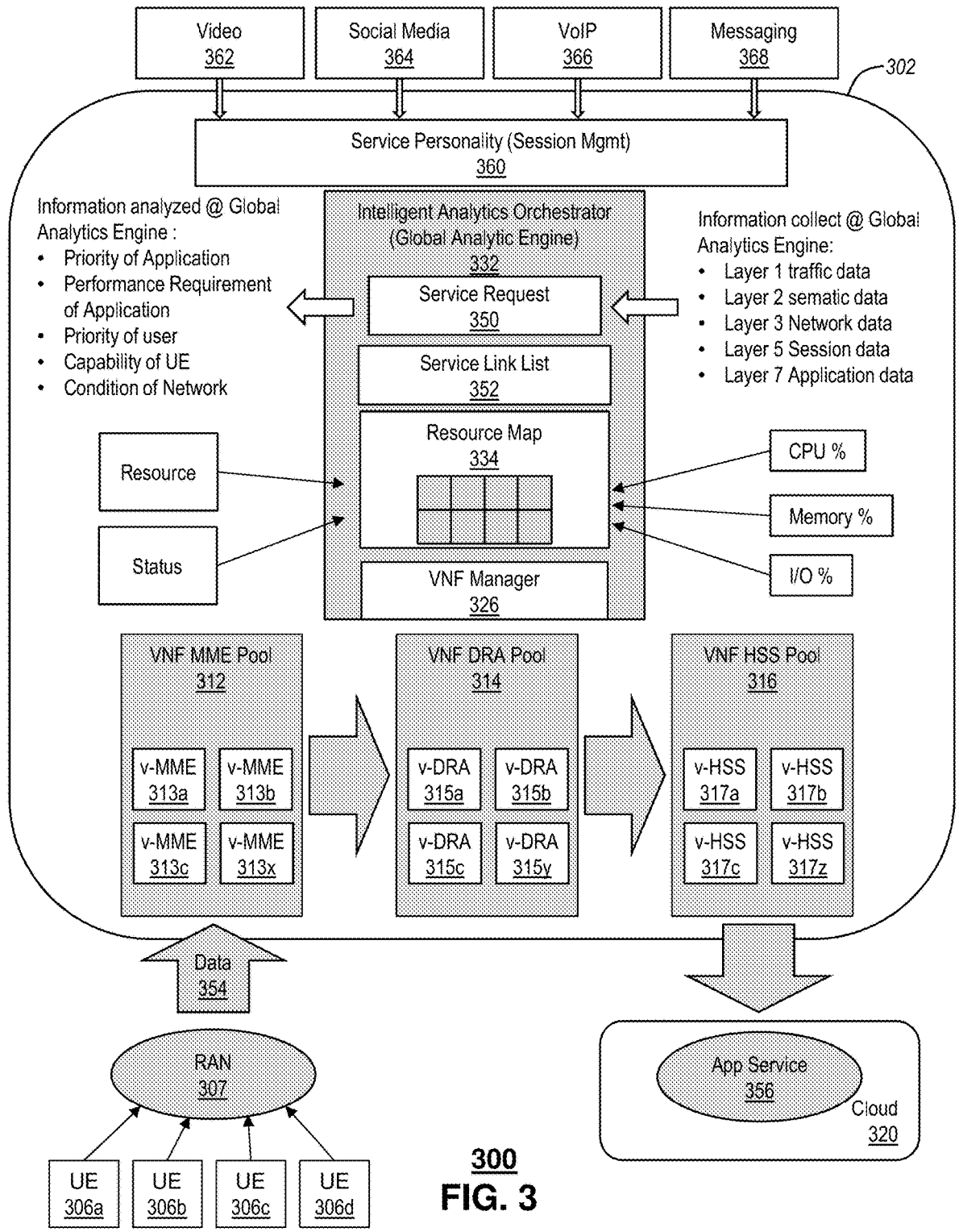
FIG. 3 depicts an illustrative embodiment of another mobile communication system that utilizes virtual network functions.

FIG. 3 depicts an illustrative embodiment of another mobile communication system 300 that utilizes virtual network functions. The system 300 includes multiple pools of VNFs. In the illustrative example, the system 300 includes an EPC of a 3GPP LTE mobile communication system. The system includes a VNF MME pool 310, a VNF Dynamic Resource Allocation (DRA) pool 212, and a VNF HSS pool 314. Each pool 310, 312, 314 can include a grouping multiple virtual machines supporting the respective network function that can be instantiated on one or multiple host machines. The groupings of host and/or virtual machines can include machines within a common location, e.g., within the same data center. Alternatively or in addition, the groupings of host and/or virtual machines can include machines spanning multiple locations. For examples, groupings can include machines at different geographical locations, e.g., at different data centers, and/or machines hosted by one or more NFV service providers.

Each of the pooled groupings of machines 312, 314, 316 can include a respective group of instantiated VNFs. For example, the VNF MME pool 312 includes a group of virtual MMEs, v-MME VNFs 313a, 313b, 313c, . . . 313x (generally 313). Likewise, the VNF DRA pool 314 includes a group of virtual v-DRA VNFs 315a, 315b, 315c, . . . 315y (generally 315), and the VNF HSS pool 216 includes a group of virtual v-HSS VNFs 317a, 317b, 317c, . . . 317z (generally 317). It is understood that one or more of the pooled VNFs 313, 315, 317 can be instantiated on a common host machine of a corresponding grouping of pooled machines. Also, the number of pooled VNFs 313, 315, 317 can vary according to management of the system 300, e.g., adding and/or removing VNFs 313, 315, 317 based on actual demand, demand forecast, and so on.

One or more UEs 306a, 306b, 306c, 306d (generally 306) submit requests for delivery of one or more services by way of the mobile communication system 300. Such services can include, without limitation video 362, social media 364, voice over IP 366, and/or messaging 368. The services can be delivered and/or otherwise established between the UE 206 and an application service 356 provided by an application service provider, e.g., by way of a cloud service 320. An end-to-end network path is established between the UE 206 and equipment of the application service provider 356. Although the example discloses a request submitted or otherwise initiated by the UE 306, it us understood that a request can be submitted or otherwise initiated by equipment of the application service provider 356. Consider an advertisement or offer for services sent to the UE 306 using an established network path. If a user of the UE 306 elects or otherwise chooses to accept the offered service, the service can be delivered using the established network path. Alternatively or in addition, it is understood that network paths can be established between UE endpoints according to any service, including the example services disclosed herein. Likewise, it is understood that network paths can be established between equipment of service providers, application service providers, and the like, according to any of the various techniques disclosed herein.

The example system 300 includes an intelligent analytics orchestrator 332. The example analytics orchestrator 332 includes a global analytic engine and a VNF manager 326. It is understood that in at least some embodiments one or more of the global analytics engine and/or the VNF manager 326 can be separate from the analytics orchestrator 332. The analytics orchestrator 332 receives a service request 350, e.g., from the UE 306 and/or equipment of the application service provider 356 to establish a network path in association with a particular service between the UE 306 and the equipment of the application service provider 356. The analytics orchestrator 332 identifies a service link list based on the endpoints 206, 356 and in at least some instances, on other factors, such as the particular type of service requested, the user priority, a capability of the UE 306 and/or the equipment of the application service provider 356, a condition of the network, and the like.

The link list can be arranged according to pairs of network elements and/or network functions. The pairs can include forwarding pairs, such that control and/or user messages and/or traffic is forwarded between the network elements and/or functions of the forwarding pairs. A link list of an example network path includes: [UE→eNB]→[v MIME→v-DRA]→[v-HSS→application server]→[application server→v-HSS]→[v-DRA→v-MME]→[eNB→UE]. Having established the link list, the analytics orchestrator 332 identifies the corresponding VNF MME pools 312, 314, 316. Having established the VNF pools, the analytics orchestrator 332 refers to an updated resource map 334 that includes metrics related to the VNFs of the VNF pools. Metrics can include availability, operational status, maintenance status, and the like. The analytics orchestrator 332 selects particular instantiated VNFs for each of the identified VNF pools based on the metrics portrayed in the resource map 334. Accordingly, particular instantiated VNFs can be associated with each pair of network functions of the link list of the network path. Consider a network path between a UE 306a and the application server 356 including a first instantiated v-MME 313a, a third instantiated v-DRA 314c and a second instantiated v-HSS 317b.

In some embodiments, once established, the network path remains virtually unchanged. In at least some embodiments, changes to an established network path can be implemented based on one or more of the metrics portrayed in the resource map, a demand level associated with the service, and the like. Accordingly the system 300, including the analytics orchestrator 332, automatically controls and/or optimizes network resources use by leveraging a metering capability at some level of abstraction appropriate to the type of service, e.g., storage, processing, bandwidth, and active user accounts.

Figure 4A:
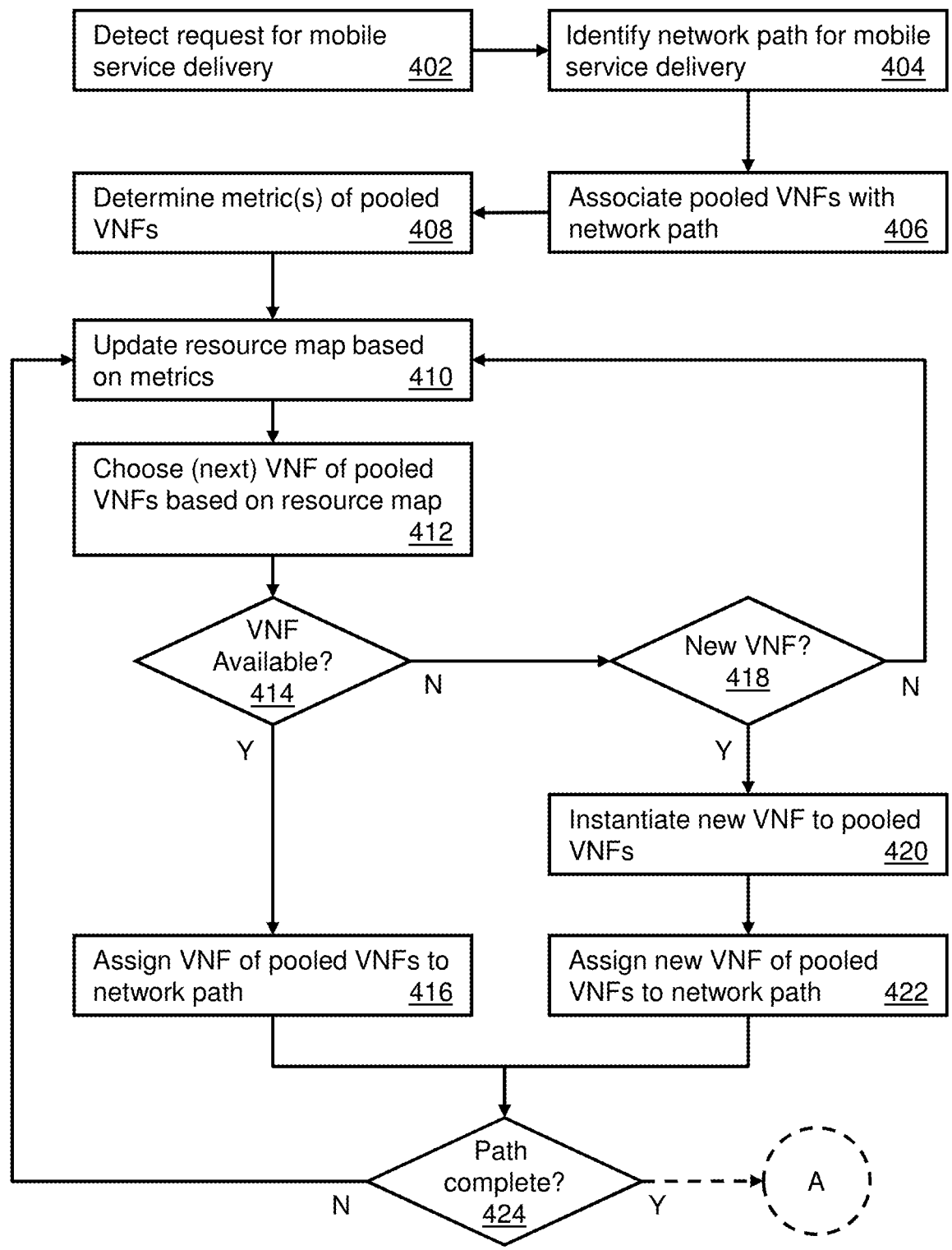
FIGS. 4A and 4B depicts illustrative embodiments of processes used in portions of the systems described in FIGS. 1, 2 and/or 3.

FIG. 4A depicts an illustrative embodiment of a process 400 used in portions of the systems described in FIGS. 1, 2 and/or 3. The process includes detecting request for delivery and/or provision of a service between network endpoints at 402. The request can be initiated by equipment of one or both of the endpoints. Alternatively or in addition, the request can be initiated or otherwise generated by other equipment, such as a service provider, a communication service provider, a broadcast service provider, an Internet of Things service subscriber, and the like. The service can include one or more of terrestrial services, satellite services, wired services, cable services, Internet services, IPTV services, IMS services, mobile cellular services, and so on.

A network path is identified for service delivery at 404. The network path can be identified according to one or more network functions to support the requested service, without necessarily identifying particular network resources, e.g., network elements and/or VNFs. Considering a service using a 3GPP LTE network, the network functions can include one or more of an eNB, and MME, an HSS, an S-GW, a P-GW, and the like.

Having established the network functions of the network path, one or more particular VNFs and/or pools VNFs are associated with the network path at 406. VNFs and/or VNF Pools can be selected according to various criteria, such as location of one or more of the endpoints, mobile operators endpoint equipment capabilities, application priorities, user priorities, network conditions. Network conditions can include historical network conditions, averaged network conditions, peak network conditions, predictive network conditions, and the like. For example, pools can be selected based on a geographical location of one or more data centers based on a location, e.g., as determined according to a tracking area update associated with at least one of the endpoint devices.

One or more metrics of the identified pooled VNFs are determined at 408. In some embodiments, determination of the metrics is based on a resource map reflecting the metrics. The resource map can include a master resource map for all instantiated VNFs of all available pools of VNFs. Alternatively or in addition, the resource map can include a tailored resource map based on the particular VNF pools associated with one or more network links. Such links might include all active links for a particular mobile operator network, links associated with a particular geographical region, links associated with a particular level of service, and so on.

The resource map is updated based on updated metrics at 410. Updated metrics can be requested by and/or provided to the analytics orchestrator 332, and/or the analytics engine 232. The metrics can include any of various metrics, such as the example metrics disclosed herein. The analytics orchestrator 332, and/or the analytics engine 232 can process and/or otherwise update the resource map based on one or more of the received metrics and/or processed metrics. In some embodiments, the resource map can be arranged in a multidimensional format. For example, the map can include a two dimensional arrangement, e.g., a table, based on VNF pools, e.g., columns, and VNF instantiations within each pool, e.g., rows. Entries of the two dimensional arrangement, e.g., table entries, can include one or more of the actual metrics, e.g., alphanumeric values, summaries of the actual metrics and/or the processed metrics. By way of examples, table entries can include a color code, a letter value, and/or an alphanumeric value that can be used by the VNF orchestrator 128, 228 and/or the analytics orchestrator 332 to select particular instantiated VNFs from among the available instantiated VNFs of each of the VNF pools.

A particular instantiated VNF of the pooled VNFs is selected at 412, based on resource map. A determination as to whether a particular instantiated VNF is available is made at 414. For example, with all else equal, an algorithm can select instantiated VNFS from among the groups of instantiated VNFs of a particular pool of VNFs. By way of non-limiting example, a selection cab be based on a position within a listing of the pooled VNFs, e.g., according to a row number of the resource map. Availability can be based on any of the metrics and/or analyzed and/or summarized results provided by the resource map.

To the extent that the VNF is available, the particular instantiated VNF of the pooled VNFs is assigned to network path at 416. A determination as to whether the network path is complete is made at 424. Such determinations can be made according to the link list of network functions based on the endpoints, the service requested, etc. To the extent that the path is not complete, i.e., not all network functions have been associated with non-virtualized and/or VNFs, the process 400 continues at 410, by updating the resource map based on metrics, choosing a next VNF of the pooled VNFs based on the updated resource map at 412, and so on.

To the extent it is determined that the VNF is not available at 414, a determination as to whether a new VNF should be instantiated is made at 418. It is envisioned that in some applications, e.g., based on resource availability, VNFs can be instantiated and removed on an as-needed base to effectively and efficiently manage network resources. To the extent it is determined at 418 that a new VNF should be instantiated, a new VNF is instantiated within a respective one of the pooled VNFs at 420. The newly instantiated VNF of the pooled VNFs is associated with the network path at 422. It is understood that the resource map can also be updated, e.g., having a row and/or column added according to the newly provisioned and/or instantiated network functions.

A determination as to whether path is complete is made at 424. To the extent that the path is not complete, the process 400 continues at 410, by updating the resource map based on metrics, choosing a next VNF of the pooled VNFs based on the updated resource map at 412, and so on.

To the extent that it is determined that a new VNF should not be instantiated at 418, continue the process 400 at 410, by updating the resource map based on metrics, choosing a VNF of the pooled VNFs based on the updated resource map at 412, and so on.

To the extent that it is determined that a path is complete at 424, the process 400 can conclude. Alternatively or in addition, the process 400 can repeat beginning at 402, e.g., detecting another request for mobile service delivery and so on. In at least some embodiments, in response to determining that a path is complete at 424, another process 450 (FIG. 4B) is implemented.

Figure 4B:
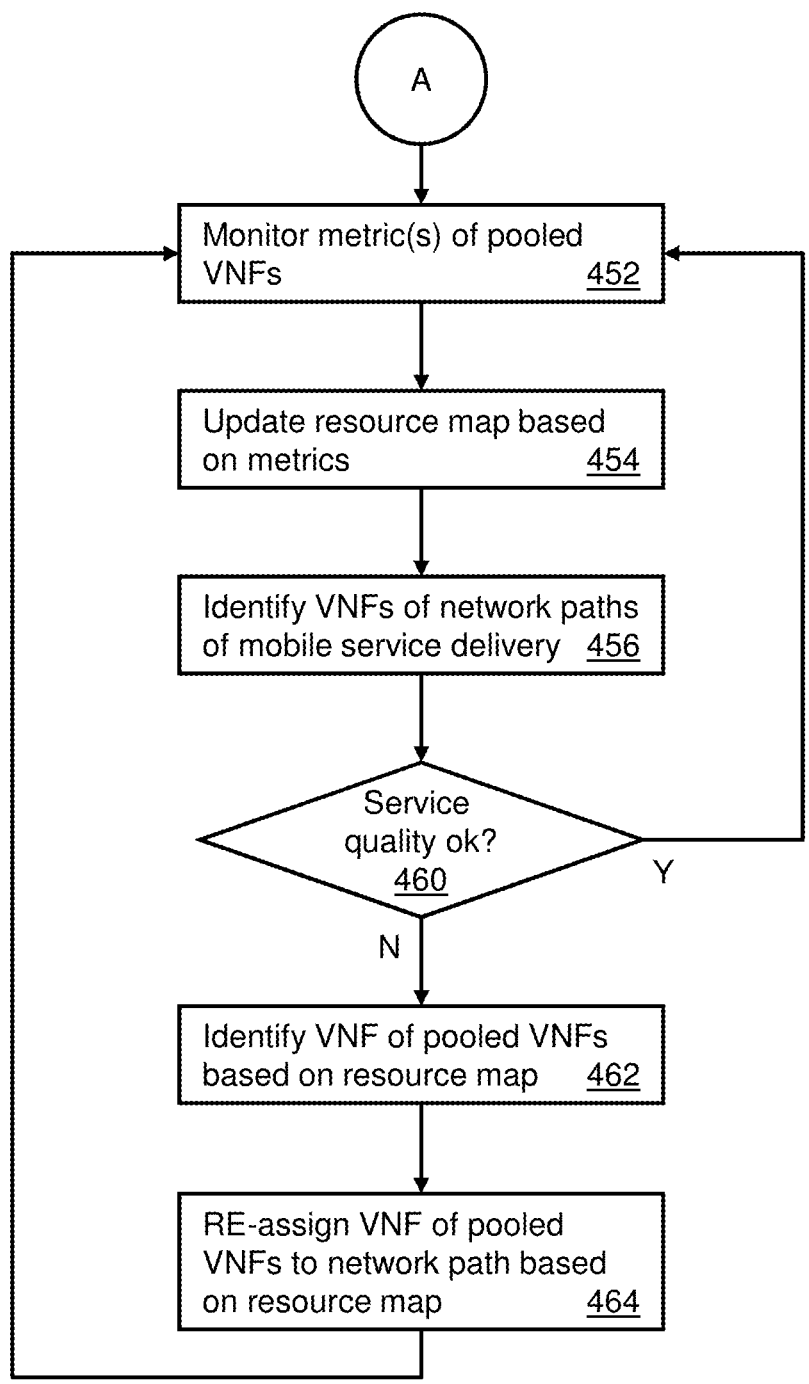

FIG. 4B depicts an illustrative embodiment of a process 450 used in portions of the systems described in FIGS. 1, 2 and/or 3. Metric(s) of pooled VNFs are monitored at 452. Such monitoring can include utilizing a resource map, such as the aforementioned resource map. The resource map is updated based on updated metrics at 454. Particular instantiations of VNFs of the network path, e.g., in relation to delivery of a mobile service, are identified at 456.

A determination as to whether the service quality is adequate is made at 460. The service quality can be based on one or more of the aforementioned metrics, e.g., as portrayed within the resource map. Based on a determination that the service quality is adequate, the particular instantiated VNF of the pooled VNFs is identified based on resource map at 462. An instantiated VNF of the pooled VNFs is reassigned to network path based on evaluation and/or inspection of the resource map at 464. In at least some embodiments, the process 450 repeats by monitoring metric(s) of pooled VNFs at 452, and so on. Alternatively or in addition, the process 450 returns to the first process 400, e.g., by detect request for mobile service delivery at 402, and so on.

It is understood that evaluation and/or inspection of the resource map can include automated techniques, e.g., implemented according to predetermined values, ranges and/or thresholds. By way of non-limiting example, instantiated VNFs within a resource map can be identified in association with a color code, e.g., red=not available/unacceptable service quality, yellow=marginally available/acceptable service quality, and green=available and acceptable service quality. A selection of a particular instantiated VNF for a particular network path to provide a particular network service and/or group of network services can be based on the current color code, a prior color code, and/or a predictive future color code of the VNF within the resource map. It is understood that marginally acceptable VNFs might be adequate to support some services, e.g., file transfer, SMS and the like, while being inadequate to support other services, such as VoIP, media streaming, and the like.

In at least some embodiments, one or more of the analytics engine 132, 232, the VNF orchestrator 128, 228 and/or the analytics orchestrator 332 can manage VNF pools based on the resource map, without necessarily waiting for and/or basing such management on particular services delivered and/or services requested. For example, if it is observed that a particular number of, fraction of, percentage of, etc. of the instantiated VNFs of a particular VNF pool and/or across multiple VNF pools are identified as being unavailable and/or marginally available, new VNFs can be instantiated and/or new and/or alternative pools identified to provide spare capacity. The resource map can be updated accordingly to account for any new instantiated VNFs and/or new VNF pools. Likewise, adjustment can be made if too much excess capacity is observed by way of the resource map, e.g., with a particular number, fraction and/or percentage of instantiated VNFs identified as having excess capacity and/or availability. For example, link lists of network paths can be rearranged to free up one or more instantiated VNFs. Once it has been determined that one or more instantiated VNFs are free or have been freed, they can be de-instantiated to free up resources, save costs, and the like.

It is understood in at least some embodiments, such decisions to add and/or remove instantiated VNFs Alternatively or in addition, such decisions can be based on historical resource map information and/or predictive future resource map information. Such predictions can be implemented according to predetermined algorithms. Alternatively or in addition, such predictive actions can be based on machine learning, e.g., artificial intelligence. Namely, current and/or future network decisions can be based at least in part on the success and/or failure of prior decisions. In this manner, one or more algorithms can be tailored to improve network performance over time.

While for purposes of simplicity of explanation, the respective processes are shown and described as a series of blocks in FIG. 4, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 5:
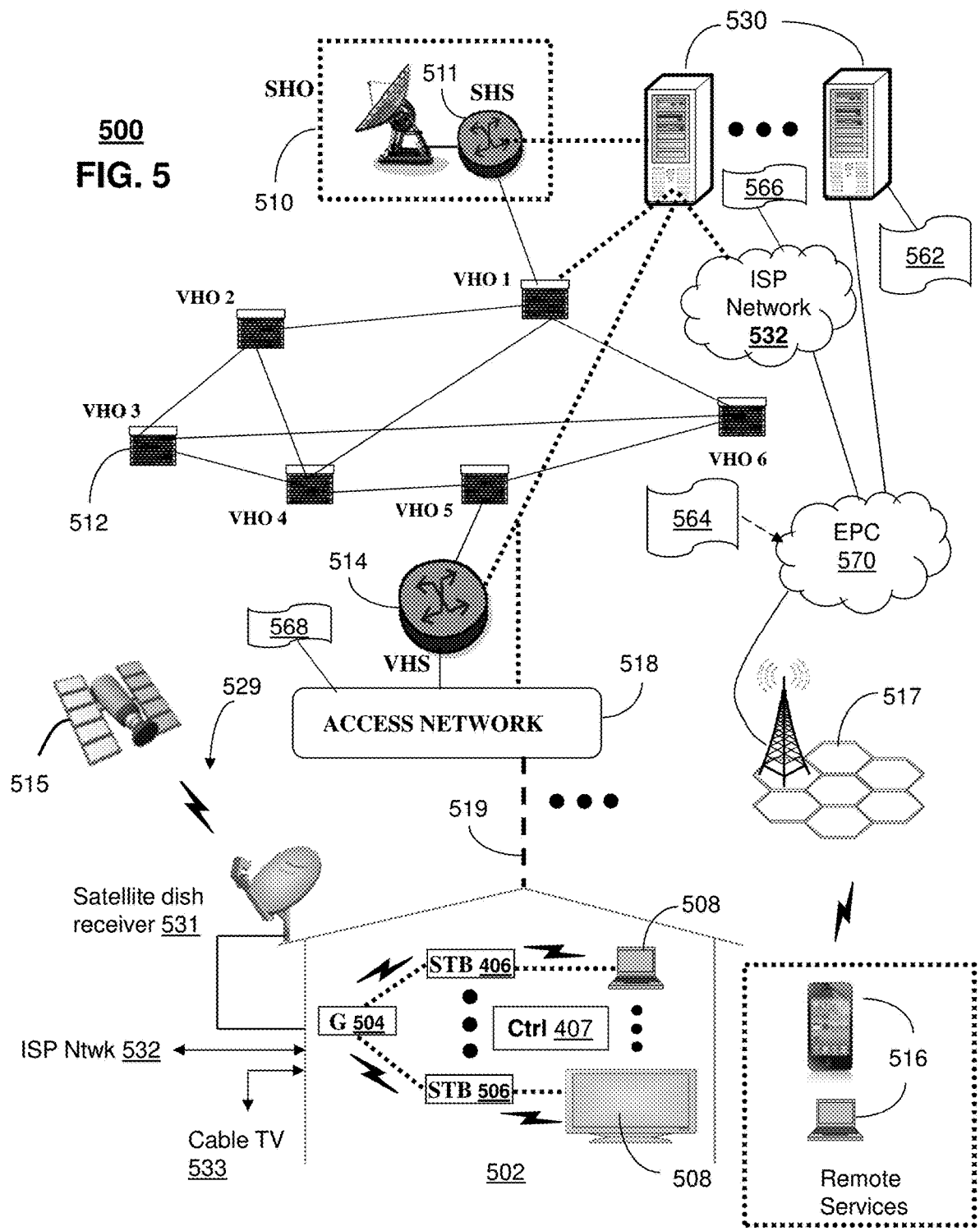
FIG. 5 depicts an illustrative embodiment of a communication system that provide media services utilizing virtual network functions of FIGS. 1, 2 and/or 3.

FIG. 5 depicts an illustrative embodiment of a first communication system 500 for delivering media content. The communication system 500 can represent an Internet Protocol Television (IPTV) media system. Communication system 500 can be overlaid or operably coupled with systems 100, 200, 300 of FIGS. 1, 2 and/or 3 as another representative embodiment of communication system 500. For instance, one or more devices illustrated in the communication system 500 of FIG. 5, can be configured to detect a request for a network service between two endpoints and identify a network path including a number of network functions between the two endpoints. The network functions of the path are associated with one or more groups or pools of redundant virtualized network resources for which metrics are determined. Particular ones of the virtualized network resources of each of the one or more groups or pools are assigned to the network path based on the usage metrics, and network services are provided between the two endpoints using the assigned resources.

The IPTV media system can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol.

The VHS 514 can distribute multimedia broadcast content via an access network 518 to commercial and/or residential buildings 502 housing a gateway 504 (such as a residential or commercial gateway). The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set-Top Boxes (STBs) which in turn present broadcast channels to media devices 508 such as computers or television sets managed in some instances by a media controller 507 (such as an infrared or RF remote controller).

The gateway 504, the media processors 506, and media devices 508 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 500. In this embodiment, signals transmitted by a satellite 515 that include media content can be received by a satellite dish receiver 531 coupled to the building 502. Modulated signals received by the satellite dish receiver 531 can be transferred to the media processors 506 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services. System 500 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 530, a portion of which can operate as a web server for providing web portal services over the ISP network 532 to wireline media devices 508 or wireless communication devices 516.

Communication system 500 can also provide for all or a portion of the computing devices 530 to function as an analytics engine and/or a VNF orchestrator (herein referred to as analytics orchestrator 530). The analytics orchestrator 530 can use computing and communication technology to perform function 562, which can include among other things, the virtual network analysis and control techniques described by the process 400 of FIG. 4A, and/or process 450 of FIG. 4B. For instance, function 562 of the analytics orchestrator 530 can be similar to the functions described for the analytics orchestrator 128, 228, 332, and/or the analytics engine 132, 232, 332, and/or the VNF manager 126, 226, 326 of FIGS. 1, 2 and/or 3 in accordance with the processes 400 of FIG. 4A and/or the process 450 of FIG. 4B. One or more network functions of the Evolved Packet Core (EPC) 570 can be provisioned with software function 564 to utilize the services of the analytics orchestrator 530. In at least some embodiments, the functions 564 of the EPC 570 can be similar to the functions described for the analytics orchestrator 128, 228, 332, and/or the analytics engine 132, 232, 332, and/or the VNF manager 126, 226, 326 of FIGS. 1, 2 and/or 3 in accordance with the processes 400 of FIG. 4A and/or the process 450 of FIG. 4B.

One or more network functions of the ISP network 532 can be provisioned with software function 566 to utilize the services of the analytics orchestrator 530. In at least some embodiments, the functions 566 of the ISP network 532 can be similar to the functions described for the analytics orchestrator 128, 228, 332, and/or the analytics engine 132, 232, 332, and/or the VNF manager 126, 226, 326 of FIGS. 1, 2 and/or 3 in accordance with the processes 400 of FIG. 4A and/or the process 450 of FIG. 4B. Likewise, one or more network functions of the access network 518 can be provisioned with software function 568 to utilize the services of the analytics orchestrator 530. In at least some embodiments, the functions 568 of the access network 518 can be similar to the functions described for the analytics orchestrator 128, 228, 332, and/or the analytics engine 132, 232, 332, and/or the VNF manager 126, 226, 326 of FIGS. 1, 2 and/or 3 in accordance with the processes 400 of FIG. 4A and/or the process 450 of FIG. 4B.

Multiple forms of media services can be offered to media devices over landline technologies such as those described above. Additionally, media services can be offered to media devices by way of a wireless access base station 517 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 6:
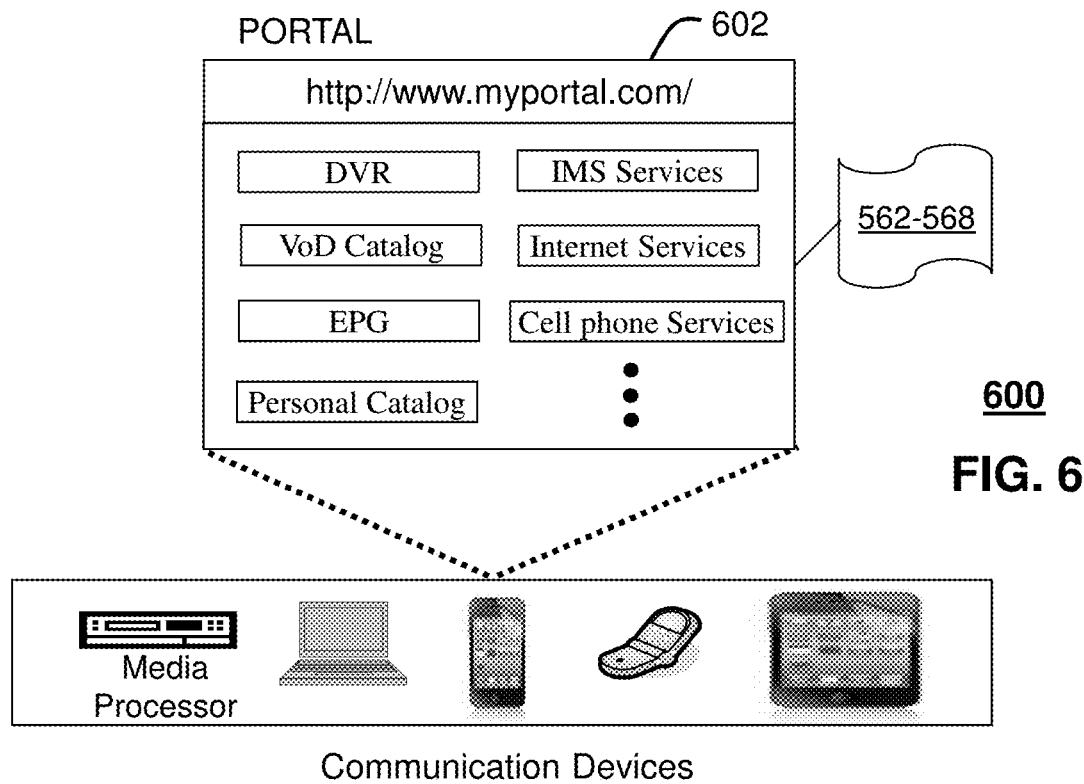
FIG. 6 depicts an illustrative embodiment of a web portal for interacting with the communication systems of FIGS. 1-3, and 5.

FIG. 6 depicts an illustrative embodiment of a web portal 602 of a communication system 600. Communication system 600 can be overlaid or operably coupled with the systems 100, 200, 300 of FIGS. 1, 2 and/or 3, and/or the communication system 500, and as another representative embodiment of systems 100, 200, 300 of FIGS. 1, 2 and/or 3, and/or the communication system 500. The web portal 602 can be used for managing services of the systems 100, 200, 300 of FIGS. 1, 2 and/or 3, and/or the communication systems 500. A web page of the web portal 602 can be accessed by a Uniform Resource Locator (URL) with an Internet browser using an Internet-capable communication device such as those described in FIGS. 1, 2, 3 and/or FIG. 4. The web portal 602 can be configured, for example, to access a media processor 506 (FIG. 5) and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 506. The web portal 602 can also be used for provisioning IMS services described earlier, provisioning Internet services, provisioning cellular phone services, and so on.

The web portal 602 can further be utilized to manage and provision software applications 562-568 to adapt these applications as may be desired by subscribers and/or service providers of systems 100, 200, 300 of FIGS. 1, 2 and/or 3, and the communication system 500. For instance, users of the services provided by the analytics orchestrator or server 530 can log into their on-line accounts and provision the VNF orchestrator 128, 228, the VNF manager 126, 226, the analytics engine 132, 232, the analytics orchestrator 332 and/or server 530 with algorithms, resource maps, available VNF pools, provide contact information to server to enable it to communication with devices described in FIGS. 1-3 and/or 4, and so on. Service providers can log onto an administrator account to provision, monitor and/or maintain the systems 100, 200, 300 of FIGS. 1, 2 and/or 3 and/or the analytics orchestrator 530.

Figure 7:
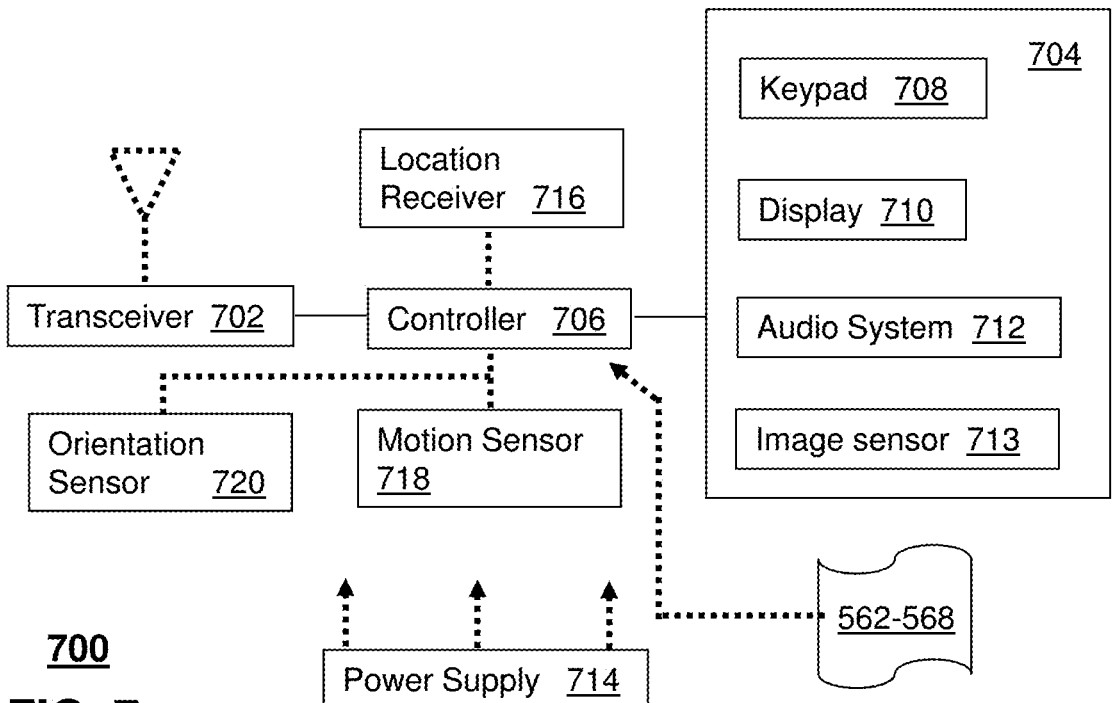
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1, 2, 3 and/or FIG. 4 and can be configured to perform portions of the procedure 400 of FIG. 4.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of devices of FIGS. 1, 2 and/or 3, the media processor 506, the media devices 508, or the portable communication devices 516 of FIG. 5. It will be appreciated that the communication device 700 can also represent other devices that can operate in systems 100, 200 of FIGS. 1 and/or 2, and the communication system 400 of FIG. 4, such as a gaming console and a media player. In addition, the controller 706 can be adapted in various embodiments to perform the functions 562-568.

The techniques disclosed herein utilize a virtual network orchestrator to dynamically assign and/or re-assign VNF resources. VNF selection can be based on an intelligent analytics virtual network orchestrator, e.g., based on a resource map of available VNF resources. The VNF orchestrator allows for selection and/or association of already instantiated VNF resources to new and/or existing network services. A resource map data structure can be used to retain and/or otherwise provide status, e.g., availability, of VNF resources. As VNF resource status changes, the resource map can be updated in real time and/or near-real time to provide a current status of VNF resources. Accordingly, analytics based orchestration can be leveraged to increase one or more of network and/or service performance, productivity, efficiency and reliability.

Upon reviewing the aforementioned embodiments, it would be evident to an artisan with ordinary skill in the art that said embodiments can be modified, reduced, or enhanced without departing from the scope of the claims described below. For example, the system can incorporate an intelligent analytics orchestrator based virtual network switching. The VNFs can be used for end-to-end service delivery of one or more of video, social media messaging, VoIP, audio services, streaming audio, image transfer, location services, messaging, file transfer, security, advertising, and the like. In some embodiments, the resource map includes an entire list of VNF pools and corresponding VNFs in each pool. An intelligent analytics virtual network orchestrator constantly uses updated VNF status information of the resource map to select the appropriate of VNF in each VNF Pool in order to fulfill service delivery.

For example, the system can incorporate a global analytics engine for network virtualization. A VNF manager sits on top of VNF pools to manage and select an appropriate VNF from each pool for end-to-end service delivery. A global analytics engine can sit on top of the VNF manager, such that the global analytics engine collects and analyzes information from each VNF pool regarding utilization and availability of each VNF within the corresponding pool. Information collected can include traffic data (Layer 1), semantic data (Layer 2), network data (Layer 3), session data (Layer 5), and/or application data (Layer 7). The information analyzed at the global analytics engine can include one or more of priority of an associated application, a performance requirement of the application, a priority of an end user, a capability of the UE and so on.

In some embodiments, the system can include analytics based virtual network service orchestration. An orchestrator receives a service request from a UE and/or application Server. The orchestrator decomposes the service request into multiple links, wherein each link includes a pair of NFVs. The pairs inter-connect with each other to build up service chain for an end-to-end delivery of applications and/or services. An orchestrator builds up a service chain graph that includes VNFs with corresponding attributes. The attributes can include resource attribute representing a resource requirement of the particular VNF. Alternatively or in addition, the attributes can include priority attribute that represent a priority of the particular VNF. The orchestrator queries an analytics based NFV resource look-up table, e.g., stored inside the orchestrator.

An NFV resource look-up table can continuously update resource utilization and availability value of each individual VNF elements inside the corresponding VNF Pool. The NFV resource look-up table can continuously receive request of a list of VNFs and the resource requirements for each of the VNFs, e.g., from orchestrator. The NFV resource look-up table can continuously search and identify the available and/or most suitable VNF elements that can meet the resource requirement for that particular VNF from the orchestrator.

In other embodiments, the system can include intelligent analytics based virtual network switching. Resource availability updates are received from each virtual machine of a VNF pool. In some embodiments, dynamic assignment/re-assignment of VNF resources is accomplished exclusively with an intelligent analytics virtual network orchestrator. The intelligent analytics virtual network orchestrator can be used for VNF selection within VNF pools each containing respective list of VNFs. A virtual network orchestrator can be used to select a particular VNF based on resource map updated based on VNF availability provided by the VNF pool. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
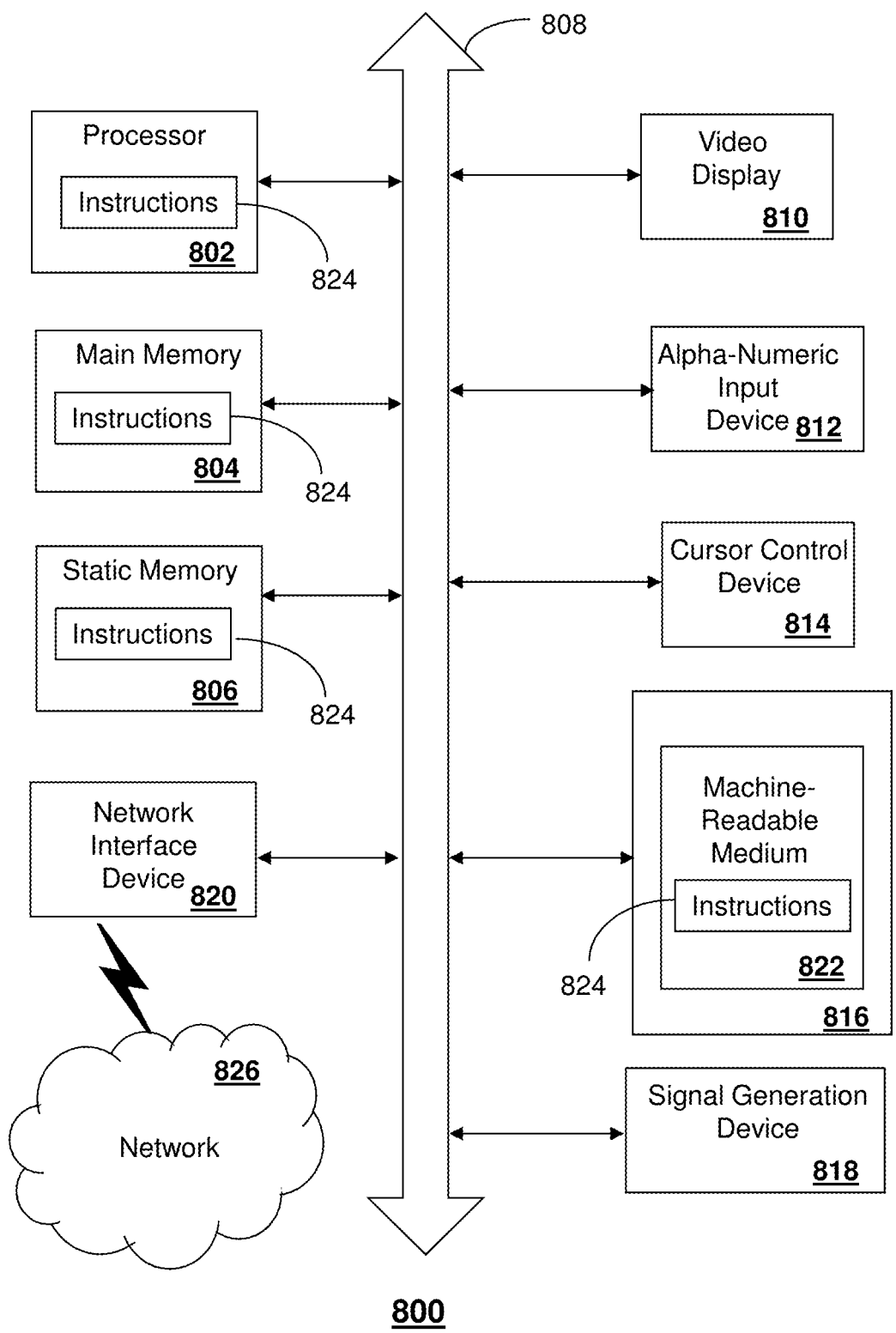
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the VNF manager 126, 226, as the VNF orchestrator 128, 228, as the analytics engine 132, 232 as one or more of the hosts 115, as the eNB 106, as the analytics orchestrator 310 as the analytics orchestrator 332, 530, the media processor 506 and other devices of FIGS. 1-3 and 5. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
a processing system including a processor; and
a memory that stores executable instructions that, when executed by the processing system, facilitate performance of operations comprising:
analyzing usage metrics of geographically distributed virtualized network resources associated with a plurality of pools of virtual network functions (VNFs) to obtain a resource map identifying virtualized network resources available to create a network path for delivery of services on a network;
selecting a first pool of VNFs of the plurality of pools of VNFs based at least in part on the resource map and a first geographical location of a first virtualized network resource corresponding to the first pool of VNFs;
assigning a first VNF from the first pool of VNFs to the network path;
selecting a second pool of VNFs of the plurality of pools of VNFs based at least in part on the resource map and a second geographical location of a second virtualized network resource corresponding to the second pool of VNFs; and
assigning a second VNF from the second pool of VNFs to the network path.

2. The system of claim 1, wherein the services comprise a mobile cellular service between first user equipment and second user equipment.

3. The system of claim 2, wherein the operations further comprise receiving a request for the mobile cellular service.

4. The system of claim 1, wherein the assigning the first VNF from the first pool of VNFs to the network path comprises assigning the first VNF from the first pool of VNFs to the network path responsive to the usage metrics in the resource map.

5. The system of claim 1, wherein the operations further comprise:
monitoring subsequent usage metrics of the geographically distributed virtualized network resources associated with the plurality of pools of VNFs;
updating the resource map according to the subsequent usage metrics to obtain an updated resource map, the updated resource map comprising the subsequent usage metrics for each virtualized network resource associated with each pool of VNFs of the plurality of pools of VNFs.

6. The system of claim 1, wherein the services comprise a mobile cellular service.

7. The system of claim 1, wherein the usage metrics comprise a processor metric, a storage metric, a network performance metric, a priority metric, or any combination thereof.

8. The system of claim 7, wherein the assigning the first VNF from the first pool of VNFs to the network path comprises assigning the first VNF from the first pool of VNFs to the network path responsive to the usage metrics in the resource map.

9. The system of claim 1, wherein the operations further comprise decomposing the network path into a plurality of links, wherein each link of the plurality of links is realized by equipment performing a corresponding pair of network functions.

10. The system of claim 9, wherein a first link of the plurality of links is realized by equipment performing the first VNF and the second VNF.

11. The system of claim 10, wherein the services comprise a mobile cellular service provided between first user equipment and second user equipment.

12. A method comprising:
analyzing, by a processing system including a processor, usage metrics of geographically distributed virtualized network resources associated with a plurality of pools of virtual network functions (VNFs) to obtain a resource map identifying virtualized network resources available to create a network path for delivery of services on a network;
selecting, by the processing system, a first pool of VNFs of the plurality of pools of VNFs based at least in part on the resource map and a first geographical location of a first virtualized network resource corresponding to the first pool of VNFs;
assigning, by the processing system, a first VNF from the first pool of VNFs to the network path;
selecting, by the processing system, a second pool of VNFs of the plurality of pools of VNFs based at least in part on the resource map and a second geographical location of a second virtualized network resource corresponding to the second pool of VNFs; and
assigning, by the processing system, a second VNF from the second pool of VNFs to the network path.

13. The method of claim 12, wherein the services comprise a mobile cellular service between first user equipment and second user equipment, and further comprising receiving, by the processing system, a request for the mobile cellular service.

14. The method of claim 12, further comprising:
monitoring, by the processing system, subsequent usage metrics of the geographically distributed virtualized network resources associated with the plurality of pools of VNFs;
updating, by the processing system, the resource map according to the subsequent usage metrics to obtain an updated resource map, the updated resource map comprising the subsequent usage metrics for each virtualized network resource associated with each pool of VNFs of the plurality of pools of VNFs.

15. The method of claim 12, further comprising decomposing the network path into a plurality of links, wherein each link of the plurality of links is realized by equipment performing a corresponding pair of network functions.

16. The method of claim 15, wherein a first link of the plurality of links is realized by equipment performing the first VNF and the second VNF.

17. A non-transitory machine-readable medium comprising executable instructions that, when executed by a processing system including a processor, facilitate performance of operations comprising:
analyzing usage metrics of geographically distributed virtualized network resources associated with a plurality of pools of virtual network functions (VNFs) to obtain a resource map identifying virtualized network resources available to create a network path for delivery of services on a network;
selecting a first pool of VNFs of the plurality of pools of VNFs based at least in part on the resource map and a first geographical location of a first virtualized network resource corresponding to the first pool of VNFs;
assigning a first VNF from the first pool of VNFs to the network path;
selecting a second pool of VNFs of the plurality of pools of VNFs based at least in part on the resource map and a second geographical location of a second virtualized network resource corresponding to the second pool of VNFs; and
assigning a second VNF from the second pool of VNFs to the network path.

18. The non-transitory machine-readable medium of claim 17, wherein the operations further comprise:
monitoring subsequent usage metrics of the geographically distributed virtualized network resources associated with the plurality of pools of VNFs;
updating the resource map according to the subsequent usage metrics to obtain an updated resource map, the updated resource map comprising the subsequent usage metrics for each virtualized network resource associated with each pool of VNFs of the plurality of pools of VNFs.

19. The non-transitory machine-readable medium of claim 18, wherein the usage metrics comprise a processor metric, a storage metric, a network performance metric, a priority metric, or any combination thereof.

20. The non-transitory machine-readable medium of claim 17, wherein the operations further comprise decomposing the network path into a plurality of links, each link of the plurality of links realized by equipment performing a corresponding pair of network functions, a first link of the plurality of links realized by equipment performing the first VNF and the second VNF.

* * * * *